(12) United States Patent
Delaney et al.

(10) Patent No.: US 8,903,074 B2
(45) Date of Patent: Dec. 2, 2014

(54) METHODS, SYSTEMS, AND COMPUTER PROGRAM PRODUCTS FOR CONGESTION-BASED ROUTING OF TELECOMMUNICATIONS SIGNALING MESSAGES

(75) Inventors: Robert J Delaney, Raleigh, NC (US); Todd Eichler, Wake Forest, NC (US)

(73) Assignee: Tekelec Global, Inc., Morrisville, NC (US)

( * ) Notice: Subject to any disclaimer, the term of this patent is extended or adjusted under 35 U.S.C. 154(b) by 2432 days.

(21) Appl. No.: 11/071,946

(22) Filed: Mar. 4, 2005

(65) Prior Publication Data
US 2006/0198508 A1    Sep. 7, 2006

(51) Int. Cl.
*H04M 7/00* (2006.01)
*H04Q 3/00* (2006.01)
*H04M 3/22* (2006.01)

(52) U.S. Cl.
CPC .......... *H04M 3/2272* (2013.01); *H04M 3/2227* (2013.01); *H04M 7/0093* (2013.01); *H04Q 3/0091* (2013.01); *H04Q 3/0025* (2013.01)
USPC .................. 379/221.01; 379/221.08

(58) Field of Classification Search
CPC ................. H04Q 3/66; H04Q 3/0016; H04Q 2213/13141
USPC ............. 379/221.12, 9.05, 221.03–221.04, 379/221.1, 16; 370/228
See application file for complete search history.

(56) References Cited

U.S. PATENT DOCUMENTS

| | | | |
|---|---|---|---|
| 5,084,816 A | | 1/1992 | Boese et al. |
| 5,253,248 A | * | 10/1993 | Dravida et al. ............... 370/228 |
| 5,915,013 A | * | 6/1999 | Mintz et al. .................. 379/230 |
| 5,933,474 A | * | 8/1999 | Kipp ........................... 379/9.05 |
| 6,018,515 A | * | 1/2000 | Sorber ......................... 370/229 |
| 6,115,383 A | | 9/2000 | Bell et al. |
| 6,215,765 B1 | | 4/2001 | McAllister et al. |
| 6,606,379 B2 | * | 8/2003 | Khadri et al. ............... 379/221.1 |
| 6,704,287 B1 | * | 3/2004 | Moharram .................... 370/242 |
| 6,747,955 B1 | * | 6/2004 | Archer ......................... 370/236 |
| 6,839,423 B2 | | 1/2005 | Khadri et al. |
| 6,996,225 B1 | * | 2/2006 | Bordonaro et al. ........... 379/229 |
| 2001/0049730 A1 | | 12/2001 | Brendes et al. |

OTHER PUBLICATIONS

Notification of Transmittal of the International Search Report and the Written Opinion of the International Searching Authority, or the Declaration for International Application No. PCT/US06/07838 (Feb. 5, 2007).

* cited by examiner

*Primary Examiner* — Fan Tsang
*Assistant Examiner* — Van D Huynh
(74) *Attorney, Agent, or Firm* — Jenkins, Wilson, Taylor & Hunt, P.A.

(57) ABSTRACT

Methods, systems, and computer program products for congestion-based routing of telecommunications signaling messages are disclosed. One method includes determining whether congestion exists on a primary SS7 signaling route to a destination. In response to determining that congestion exists on the primary SS7 signaling route, the method includes redirecting messages to be sent over the primary SS7 signaling route to an alternate SS7 signaling route to the destination independently of whether the primary route is in a failed state.

24 Claims, 7 Drawing Sheets

METHODS, SYSTEMS, AND COMPUTER PROGRAM PRODUCTS FOR CONGESTION-BASED ROUTING OF TELECOMMUNICATIONS SIGNALING MESSAGES

TECHNICAL FIELD

The subject matter described herein relates to routing messages in a telecommunications signaling network. More particularly, the subject matter described herein relates to methods, systems, and computer program products for congestion-based routing of signaling messages in a telecommunications signaling network.

BACKGROUND

Signaling system 7 (SS7) is the standard signaling protocol that has been used to control voice calls in public telephone networks since the late 1980s. In addition to the control of voice calls, SS7 signaling enables modern telephony services, such as toll-free free calling, call forwarding, caller ID, local number portability (LNP), and even mobile communications services. SS7 network nodes used in setting up calls and providing additional services include service switching points (SSPs), signal transfer points (STPs), and service control points (SCPs). SSPs perform call setup signaling and control voice trunks over which calls are carried. STPs route SS7 messages between other network nodes. SCPs provide database services to SSPs.

FIG. 1 illustrates a conventional SS7 network. In FIG. 1, the SS7 network includes STPs 100, 102, 104, and 106, SSP 108, and SCPs 110 and 112. STPs 100, 102, 104, and 106 are interconnected by linksets LS1-LS6. Each linkset includes a plurality of channels, which are referred to as signaling links. Each pair of nodes is connected by a single linkset. Messages are distributed among links in a linkset using load balancing algorithms. STPs 100, 102, 104, and 106 maintain routing tables that contain signaling routes corresponding to linksets. In SS7 networks, signaling messages are routed based on destination point code (DPC) values. When a signal transfer point receives a message, it examines the destination point code of the message and selects a route from the routing table. The route corresponds to a linkset. The signal transfer point then selects a link within the linkset and forwards the message over the link. STPs 100, 102, 104, and 106 also maintain status information associated with SS7 signaling routes. For example, if a signaling route becomes unavailable, the signal transfer point preferably detects this fact and marks the route unavailable in its route tables. Similarly, if a route becomes congested, the signal transfer point marks the route as congested in its route table.

In an SS7 network, the above-described route status management functionality is accomplished, in part, through the use of specific network management messages. A sample structure of a typical SS7 message signaling unit (MSU) 200 that carries network management information is illustrated in FIG. 2. It will be appreciated by those skilled in the art of SS7 signaling communications that signaling information field (SIF) 202 of MSU 200 can contain data associated with a particular point code that is experiencing difficulty. Additional status information and other relevant maintenance codes may also be included in SIF parameter 202, depending upon the particular type of network management message being sent. The service indicator octet (SIO) 204 is used by level-three to identify the type of protocol used at level four (such as the ISDN user part (ISUP) or transaction capabilities application part (TCAP). SIO 204 also has additional bits that can be used for message priorities, as discussed further below.

Returning to FIG. 1, messages may be sent from, for example, SSP 108 to either of SCPs 110 and 112 via STP 100 using any one of a plurality of routes. For example, one route can include STP 100, LS1, and STP 104. For the present purposes, this route can be referred to as the primary route. Alternate routes, however, exist. For example, alternate routes can include STP 100, LS3, and STP 106 or STP 100, LS5, STP 102, LS2, and STP 106. Conventionally, routing is performed by assigning a relative cost to each route and assigning traffic to the route based on the relative cost.

In the example illustrated in FIG. 1, STP 100 may determine that congestion exists on the route corresponding to signaling linkset LS1 using any of a variety of methods for detecting congestion. For example, the number of messages waiting to be sent over the route and being held in the transmission buffer may be counted to determine if a threshold that indicates congestion on the route is exceeded. If STP 100 determines there is congestion on the route corresponding to LS1, when an MSU is received from SSP 108 at STP 100 for routing over LS1, STP 100 may discard the MSU based upon congestion level and send a transfer controlled (TFC) message with a congestion level indicator to SSP 108. The congestion level indicator conveys the minimum priority level a message must possess before it will be routed over the congested route. STP 100 sets the congestion level based on the severity of the congestion. For messages sent to STP 100 for routing, priorities are assigned by the originating signaling point, in this case SSP 108, and stored as a two-bit priority level in SIO field 204 of MSU 200. The priority level indicator is typically a two-bit code that indicates the relative priority of the message. When a message is received by STP 100, the two-bit priority level (0, 1, 2, or 3) is read from SIO field 204 and compared to the current congestion level. Only messages of the same or higher priority level than indicated by the current congestion level will be routed by STP 100 via LS1. Messages with lower priorities destined for LS1 will be discarded by STP 100, and a corresponding TFC message will be sent to the originating signaling point.

If LS1 is congested at the same congestion level for a long enough period of time, e.g., 10-120 seconds as determined by an SS7-specified congestion timer (referred to as T31), LS1 is considered to be in link failure. Once the LS1 is considered to be in link failure, traffic from SSP 108 to SCPs 110 and 112 can be sent over an alternate route. However, immediately after congestion occurs (prior to the expiration of T31), or when the congestion level changes such that T31 does not expire, traffic sent by SSP 108 and routed to SCPs 110 or 112 via LS1 will be limited to higher priority traffic. Lower priority traffic is discarded, rather than being re-routed, for the duration of timer T31 or indefinitely if congestion levels change to continually reset T31.

In some cases, traffic may be evenly distributed within the links of linkset LS1 to minimize congestion. However, several of the links in linkset LS1 may become congested. In such a case, traffic is discarded according to the TFC procedure described above, even when a viable alternate route, such as LS3 or LS5 exists. That is, there is currently no procedure for re-routing messages to an alternate route based on a primary route experiencing congestion (prior to route failure).

Accordingly, there exists a need for methods, systems, and computer program products for re-routing signaling messages over alternate routes when a route is experiencing congestion but is not in failure.

SUMMARY

In one aspect of the subject matter disclosed herein, a method for congestion-based routing includes determining whether congestion exists on a primary SS7 signaling route to a destination and, in response to determining that congestion exists on the primary SS7 signaling route, redirecting messages to be sent over the primary SS7 signaling route to an alternate SS7 signaling route to the destination independently of whether the primary signaling route is in a failed state.

The primary SS7 signaling route and the alternate SS7 signaling route may correspond to traditional TDM-based SS7 linksets. Alternatively, the primary SS7 signaling route and/or the alternate SS7 signaling route may correspond to IP-based SS7 signaling linksets. For example, the primary and/or alternate SS7 signaling route may correspond to a linkset that carries SS7 signaling messages encapsulated using an SS7 signaling adaptation layer, a stream control transmission protocol layer, and an Internet protocol layer. Congestion may be detected on a primary IP-based SS7 route using the same methods described below for TDM-based SS7 routes. Traffic may be switched to an IP-based alternate SS7 route when congestion occurs using the same methods described below for TDM-based SS7 routes.

In another aspect of the subject matter disclosed herein, a system for congestion-based routing at an SS7 network node includes a routing function configured to determine whether congestion exists on a primary SS7 signaling route to a destination and to redirect messages to be sent over the primary SS7 signaling route to an alternate SS7 signaling route to the destination in response to determining that congestion exists on the primary SS7 signaling route independently of whether the primary route is in a failed state.

In another aspect of the subject matter disclosed herein, a computer program product including computer executable instructions embodied in a computer-readable medium determines whether congestion exists on a primary SS7 signaling route to a destination and, in response to determining that congestion exists on the primary SS7 signaling route, redirects messages to be sent over the primary SS7 signaling route to an alternate SS7 signaling route to the destination independently of whether the primary route is in a failed state.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, or transport the program for use by or in connection with the instruction execution system, apparatus, or device. The computer-readable medium can be, for example, an electronic, magnetic, optical, electromagnetic, or semiconductor system, apparatus, or device. More specific examples (a non exhaustive list) of the computer-readable medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

Figure 3:
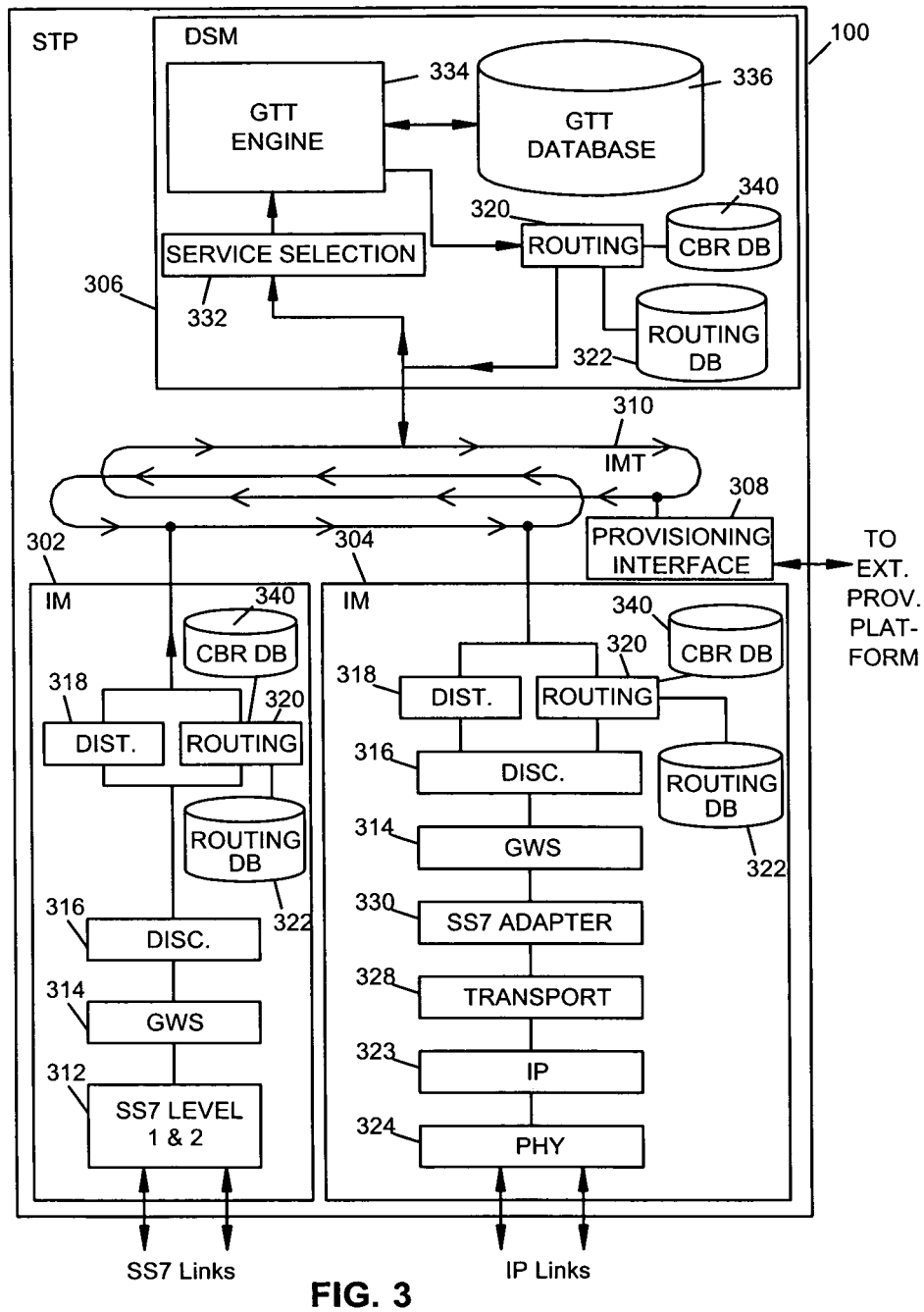
FIG. 3 is a block diagram illustrating an STP for performing congestion-based routing according to an aspect of the subject matter disclosed herein.

FIG. 3 is a block diagram illustrating an STP for performing congestion-based routing according to an aspect of the subject matter disclosed. Referring to FIG. 3, STP 100 includes a plurality of internal processing modules for routing and processing SS7 messages. In the illustrated example, STP 100 includes a first interface module 302 for sending and receiving SS7 messages via TDM-based SS7 signaling links, a second interface module 304 for sending and receiving SS7 signaling messages via IP-based SS7 signaling links, a database services module 306 for performing database related services, and a provisioning interface 308 for allowing an external system to provision databases within STP 100. As used herein, the term "interface module" refers to a collection of hardware, software, and/or firmware that interfaces with at least one SS7 signaling link and is not intended to be limited to interfacing with TDM-based SS7 signaling links or IP-based SS7 signaling links. In the illustrated example, modules 302, 304, 306, and 308 are connected via an interprocessor communications system 310. Interprocessor communications system 310 may be any suitable mechanism for carrying messages between processing modules. In one exemplary implementation, interprocessor communications system 310 may include bus. In an alternate implementation, interprocessor communications system 310 may include an Ethernet LAN.

Interface module 302 includes an SS7 level one and two module 312 for performing SS7 level one and two functions, such as error detection, error correction, and sequencing of SS7 messages transmitted and received over TDM-based SS7 signaling links. Gateway screening module 314 determines whether to allow messages for further processing and subsequent transmission into a network. Discrimination module 316 analyzes destination point codes in a message to determine whether messages are destined for the node and further processing is required or whether the messages are to be through-switched. Distribution module 318 distributes messages identified by discrimination module 316 as requiring further processing to other internal processing modules for the processing to be performed. Routing module 320 routes messages identified by discrimination module 316 as being destined for other signaling nodes. Routing module 320 may access a routing database 322 to route the messages.

Interface module 304 includes a physical layer 324 for performing physical layer functions for IP signaling links. Network layer 326 performs network layer functions, such as IP forwarding and, optionally, participating in IP routing protocols. Transport layer 328 performs transport layer functions, such as UDP, TCP or SCTP functions. SS7 adapter layer 330 performs functions for adapting SS7 traffic to be sent and/or received over an IP network. Examples of protocols that may be implemented by SS7 adapter layer 330 include any of the SS7 adaptation layer protocols, including TALI, M2PA, M3UA, or SUA, as described in the correspondingly named IETF Internet Drafts and RFCs. Thus, layers 324, 326, 328, and 330 perform functions for sending and receiving SS7 messages over IP-based SS7 signaling links. Gateway screening module 314, distribution module 318, routing module 320, and routing database 322 perform the same functions as those described above with regard to interface module 302. Hence a description of these functions will not be repeated herein.

Database services module 306 includes a service selection module 332 for selecting a service for messages identified as requiring further internal processing. Service selection may be performed based on one or more SCCP parameters in a signaling message, such as translation type, nature of address indicator, routing indicator, global title indicator, number plan, etc. Global title translation engine 334 performs global title translation based on the called party address, optionally, and the originating point code in a received signaling message. Global title translation database 336 may include data for performing intermediate and final global title translation. Routing function 320 and routing database 322 perform similar functions to those described with regard to interface module 302. Hence, a description thereof will not be repeated herein.

According to an aspect of the subject matter described herein, interface modules 302 and 304 and DSM 306 may each include a congestion-based routing (CBR) database 340 for storing information related to congestion-based routing, as will be described further below. Alternatively, congestion-based routing database 340 may be combined with routing database 322. Routing module 320 accesses congestion-based routing database 340 and routes messages accordingly. For example, when a message is to be routed over a known congested route, routing module 320 may access congestion-based routing database 340 to determine an alternate route for the message. Accordingly, a system for congestion-based routing at an SS7 network node includes logic configured to redirect messages to be sent over the primary SS7 signaling route to an alternate SS7 signaling route to the destination in response to determining that congestion exists on the primary SS7 signaling route.

Figure 1:
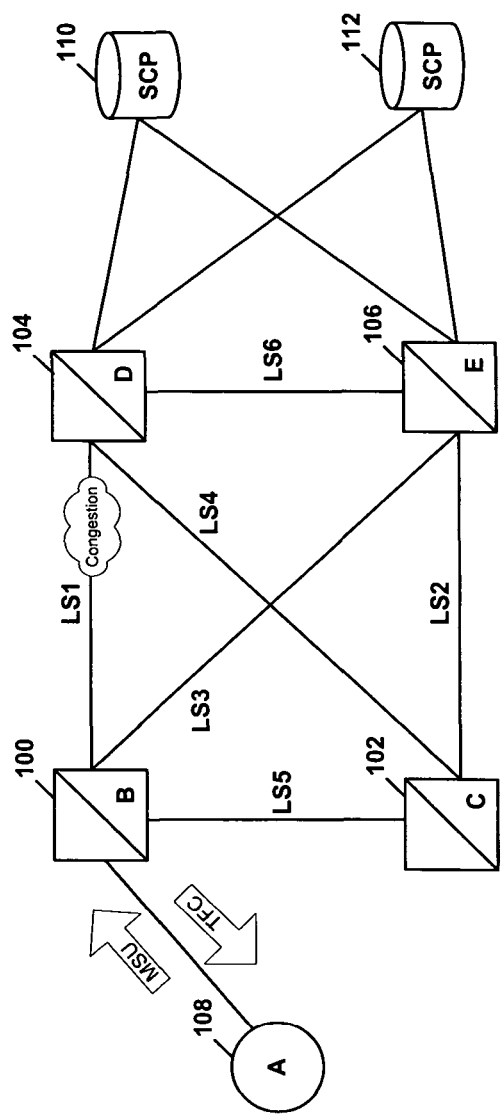
FIG. 1 is a block diagram illustrating a conventional SS7 network.
Figure 2:
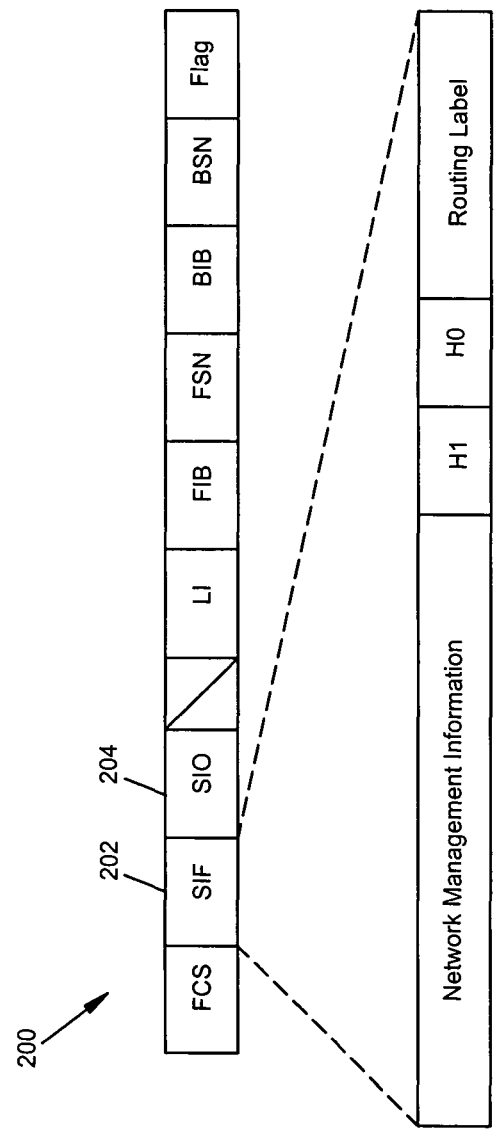
FIG. 2 is a block diagram illustrating a sample structure of a typical SS7 message signaling unit that carries network management information.

Table 1 below illustrates an exemplary implementation for a data structure stored in congestion-based routing database 340. Specifically, Table 1 illustrates congestion-based routing data for LS1 illustrated in FIG. 1. It is understood that similar data may be included for LS3 and LS5.

Table 1 includes congestion levels 0-3 as discussed above. For each congestion level, there are corresponding message priorities. Again, as discussed above, message priorities may be provided by the originating signaling point to STP 100 in SIO field 204 of each MSU 200. When an MSU is received having a priority that is lower then the current congestion level, messages to be sent over the primary signaling route are redirected to an alternate signaling route to the destination. As can be appreciated, these messages would normally be discarded according to the TFC procedure, but are instead forwarded via an alternate route. An identifier for the alternate route is also shown in Table 1. Table 1 also includes a percentage field that indicates a percentage of messages that will be redirected over the alternate route and timer fields that control switching between the primary and alternate routes.

TABLE 1

Congestion-based Routing Data for LS1

| Congestion Level on Primary Route | Message Priority | Alternate Route | Percent Priority Message Redirected | Timer 1 (T1) | Timer 2 (T2) |
|---|---|---|---|---|---|
| 0 | — | — | — | | |
| 1 | 0 | LS3 | 10% | 2 s | 3 s |
| 2 | 1 | LS3 | 50% | 2 s | 3 s |
| 3 | 2 | LS5 | 100% | 2 s | 3 s |

According to one aspect of the subject matter described herein, instead of sending all messages of lower priority via the alternate route, congestion-based routing database 340 may also include corresponding percentages of messages to be redirected, as shown in the exemplary implementation of Table 1. The percentage of traffic that is redirected over the alternate route may differ according to priority level. For example, as shown in Table 1, if the primary route is at congestion level 1, then 10% of priority 0 traffic would be sent over the alternate route. Alternatively, if the primary route is at congestion level 2, then 50% of priorities 0 and 1 traffic would be sent over the alternate route. Finally, if the primary route is at congestion level 3, then 100% of priorities 0-2 traffic would be sent over the alternate route. Note here that priority 3 traffic is still sent over the primary route. However, the subject matter described herein is not limited to sending priority 3 traffic over the primary route. In an alternate implementation, Table 1 may be modified so that priority level 3 traffic may be routed over the alternate route when the congestion level is three.

Although different percentages are assigned to different priority levels, it is understood that the percentages shown in Table 1 are merely exemplary. Accordingly, the percentages for one or more priorities may be the same or different and may range anywhere from 0% to 100%. Note that when less than 100% of messages are redirected over the alternate route, the remaining messages may be discarded according to the TFC procedure.

According to another aspect of the subject matter described herein, the one or more timer values in may be included in congestion-based routing database 340 and may be used to prevent oscillation between the primary and alternate routes. For example, Timer 1 may include a value corresponding to a minimum time duration during which congestion must be at the specific congestion level to begin congestion-based routing according to the corresponding congestion level. A Timer 2 value may also be included and corresponding to a minimum time duration during which congestion must be at a second, lower, congestion level in order to switch to congestion-based routing according to the lower congestion level or to switch back to normal routing via the primary route. For example, if the route corresponding to LS1 is at congestion level 1 for at least two seconds, congestion-based routing will begin by routing 10% of the priority level 0 traffic over LS3. If the congestion abates to level zero, the redirected priority level 0 traffic will not be immediately switched back to LS1. Instead, 10% of the priority level 0 traffic will continue to be routed over LS3 until the timer T2 expires. Once the timer T2 expires, the re-directed traffic will be switched back to the primary route. Thus, the timers T1 and T2 prevent oscillation between the primary and alternate routes. It should be noted that Timer 1 may be employed without Timer 2.

Figure 4:
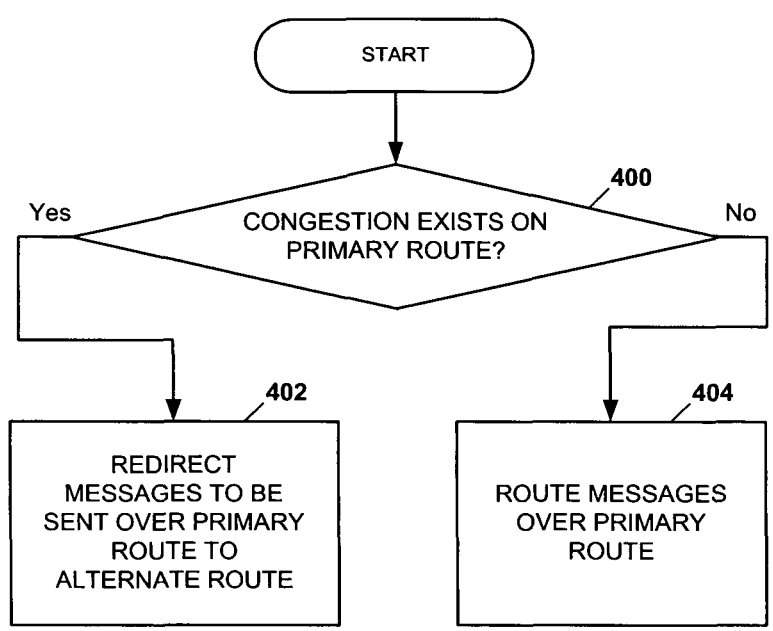
FIG. 4 is a flow diagram illustrating a method for congestion-based routing according to one aspect of the subject matter disclosed herein.

FIG. 4 is a flow diagram illustrating a method for congestion-based routing according to one aspect of the subject matter disclosed. The steps illustrated in FIG. 4 may be implemented by any of routing functions 320 illustrated in FIG. 3. Referring to FIG. 4, routing function 320 determines whether congestion exists on a primary SS7 signaling route to a destination in step 400. For example, routing function 320 may determine a number of messages waiting to be transmitted over a link associated with the primary SS7 signaling route. Alternatively, or in addition, routing function 320 may determine a number of messages transmitted over a link associated with the primary SS7 signaling route that are waiting to be acknowledged by a remote endpoint. These congestion determinations may be made, for example, by checking transmit and/or retransmit buffers (not shown in FIG. 1) in STP 100 that are associated with the route for the number of messages stored therein. As will be appreciated by one of ordinary skill in this art, other methods of determining whether congestion exists may also be employed.

Once routing function 320 determines that congestion exists on a primary route, routing function 320 may mark the route as congested in routing database 322. A congestion level may also be associated with the route. However, congestion based routing as described herein is not limited to using the congestion level to determine when to route messages over an alternate route. In the implementation illustrated in FIG. 4, messages may be redirected over the alternate route whenever any congestion exists, independently of the congestion level. In step 402, messages intended for the primary route are redirected over the alternate route. If congestion does not exist on the primary route, control proceeds to step 404 where the messages are routed over the primary route. Accordingly, using the steps illustrated in FIG. 4, routing function 320 routes messages over an alternate route when congestion exists on a primary route, independently of whether the primary route is in a failed state.

Figure 5:
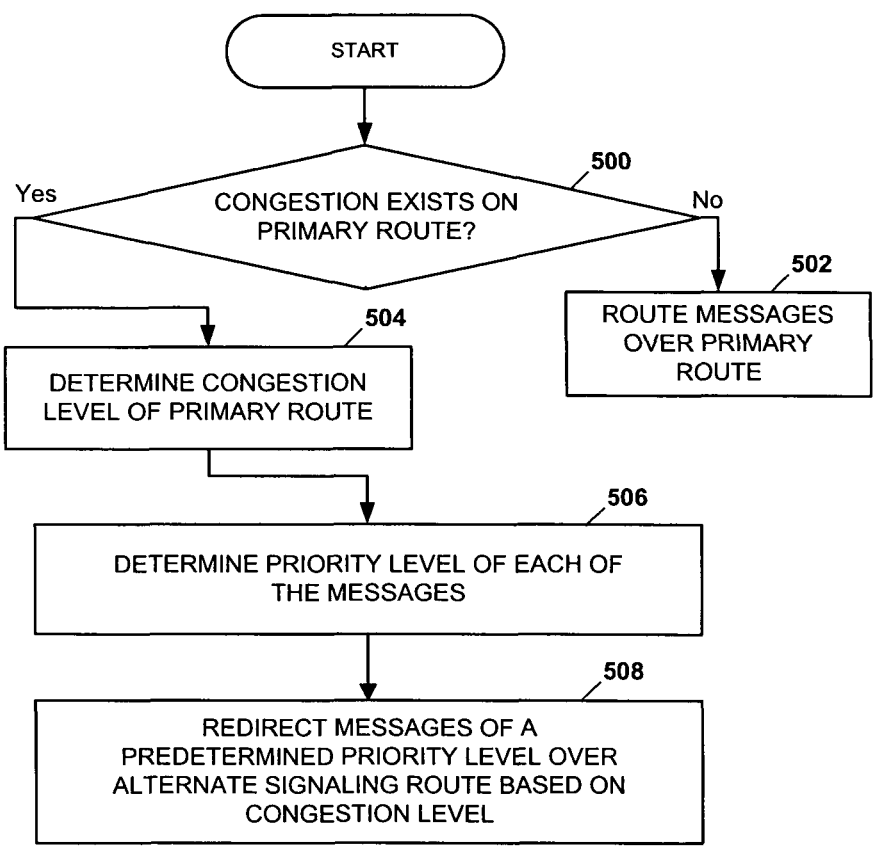
FIG. 5 is a flow diagram illustrating a method for congestion-based routing according to another aspect of the subject matter disclosed herein; and an FIGS. 6A and 6B is a flow diagram illustrating a method for congestion-based routing with timers to control oscillation according to another aspect of the subject matter disclosed herein.

FIG. 5 is a flow diagram illustrating a method for congestion-based routing according to another aspect of the subject matter disclosed herein. Referring to FIG. 5, routing function 320 determines whether congestion exists on a primary SS7 signaling route to a destination in step 500, as described above. If the primary route is not congested, control proceeds to step 502 where received messages destined for the primary route are routed over the primary route. In response to determining that congestion exists on the primary route in step 500, the congestion level is determined in step 504. In step 506, a priority level of each of the messages is determined. Messages of a predetermined priority level are redirected over an alternate SS7 signaling route based on the determined congestion level in step 508. As described above, redirecting messages of a predetermined priority level over the alternate SS7 signaling route may include redirecting only a percentage of messages to be sent over the primary SS7 signaling route to the alternate SS7 signaling route, where the percentage may be based on the priority level of messages and the congestion level for the primary route. For example, routing function 320 may only redirect messages of lower priority than the current congestion level over the alternate route. Under standard SS7 congestion routing procedures, these messages would normally be discarded. However, according to the subject matter described herein, these messages are routed over an alternate route. Thus, by avoiding the discarding of at least some of the messages destined for a congested route, the subject matter described herein increases the efficiency of an SS7 network.

Figure 6A:
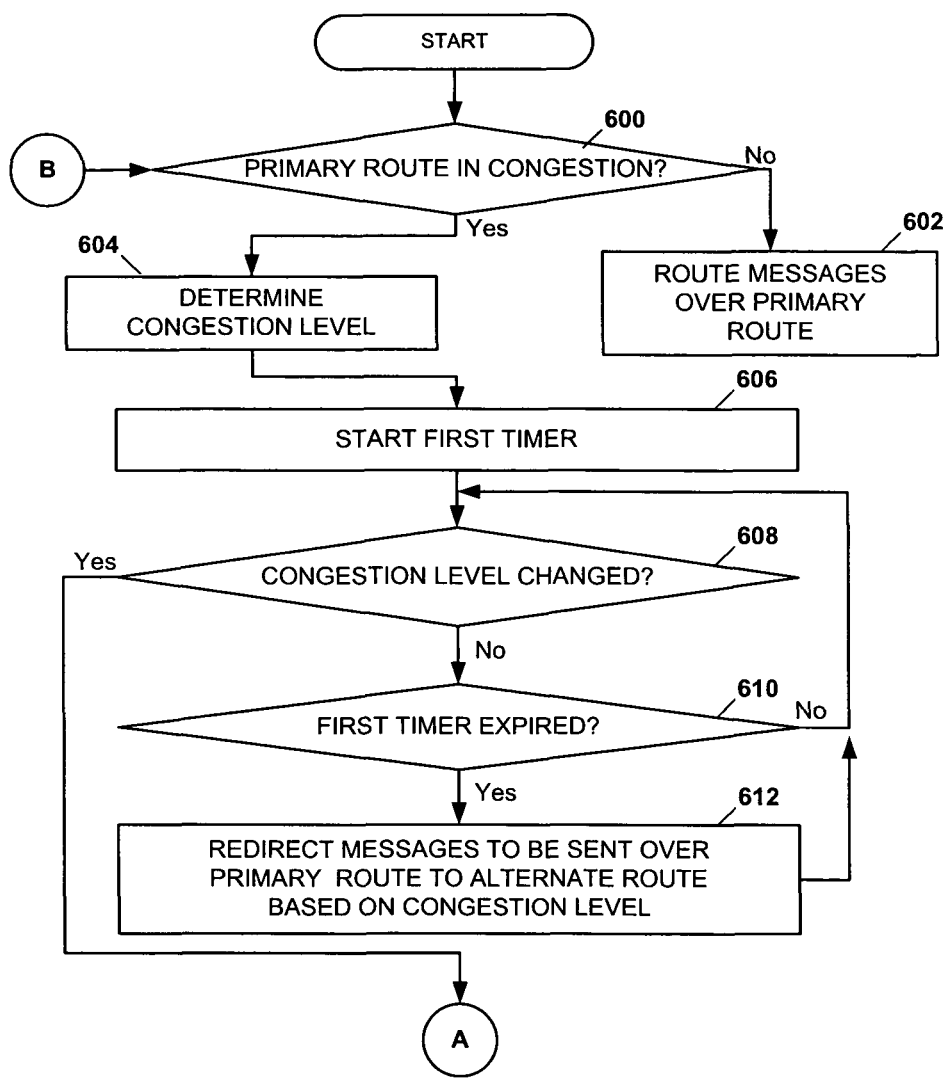
Figure 6B:
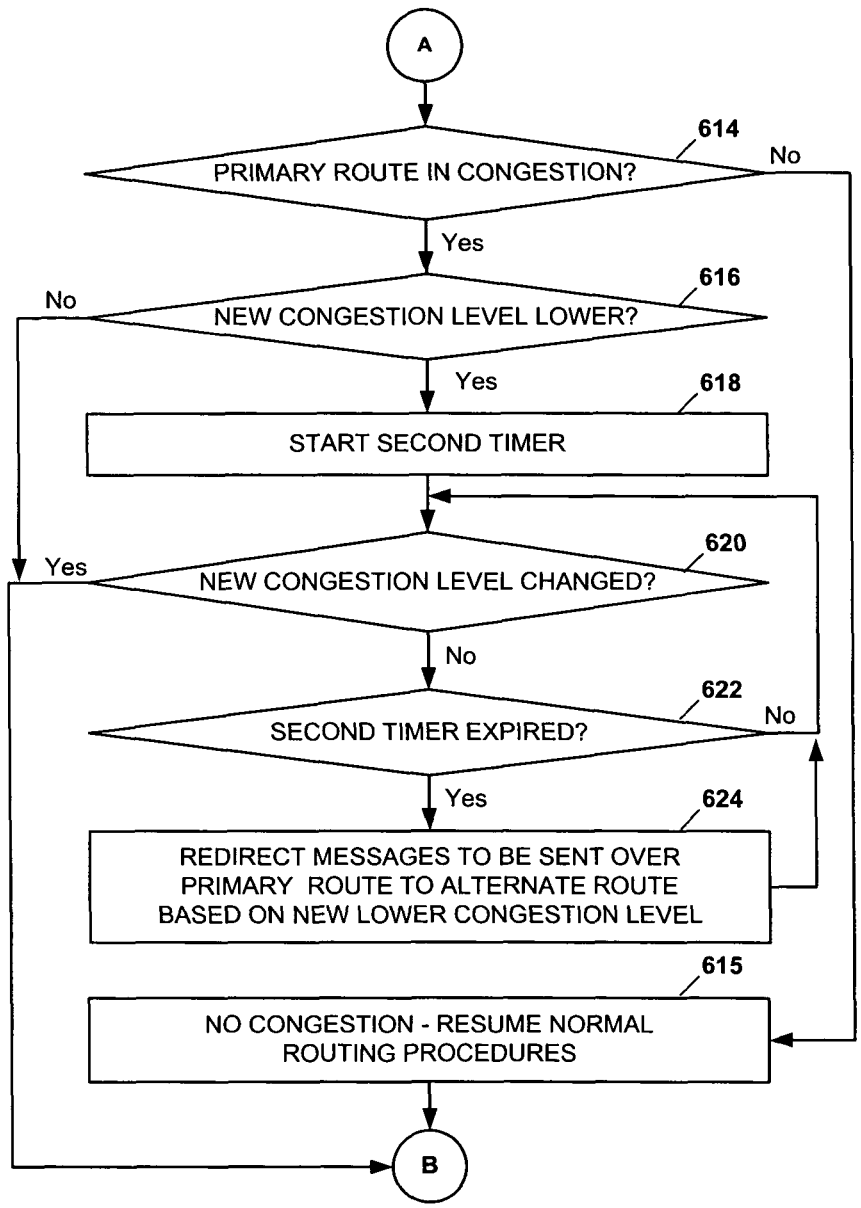

FIGS. 6A and 6B is a flow diagram illustrating a method for congestion-based routing with timers to control oscillation according to another aspect of the subject matter disclosed herein. Referring to FIG. 6A, routing function 320 determines whether congestion exists on a primary SS7 signaling route to a destination in step 600. If no congestion exists on the primary route, control proceeds to step 602 where messages are routed over the primary route. In response to determining that congestion exists on the primary route in step 600, the congestion level is determined in step 604. A first timer is started in step 606. In step 608, routing function 320 determines whether the congestion level on the primary route has changed and in step 610, whether the first timer has expired. Responsive to the congestion level remaining unchanged during the time duration of the first timer according to steps 608 and 610, messages to be sent over the primary route are redirected to the alternate route based on the congestion level in step 612 and control returns to step 608 to determine if the congestion level has changed. In response to the congestion level changing in step 608, control proceeds to the steps illustrated in FIG. 6B through connector A.

Referring to FIG. 6B, in step 614, routing function 320 determines whether the primary route is in congestion. If congestion no longer exists in step 614 (after the change in congestion level in step 608), normal routing procedures are resumed in step 616 and control returns to step 600 via connector B.

Returning to step 614, in response to determining that congestion exists on the primary route, control proceeds to step 616 where routing function 320 determines whether the new congestion level is lower than the previous congestion level of the route. If the new congestion level is higher in step 616, control returns to step 600 via connector B to perform congestion-based routing based on the new congestion level.

In contrast, if the new congestion level is lower in step 616, a second timer is started in step 618. In step 620, routing function 320 determines whether the new congestion level has changed since the level that it was when second timer was started. In step 622, routing function 320 determines whether the second timer has expired. Responsive to the congestion level remaining unchanged during the time duration of the second timer according to steps 620 and 622, messages that are being sent over the alternate route are redirected to the primary route based on the new lower congestion level of the primary route in step 624 and control returns to step 620 to determine if the congestion level has again changed. In response to the new congestion level changing in step 620, control returns to step 600 via connector B to perform congestion-based routing based on the new congestion level. Thus, the first timer prevents excessive switching of traffic to alternate routes when congestion on the primary route is increasing, and the second timer prevents excessive switching of traffic when congestion is decreasing.

Accordingly, the methods, systems, and computer program products described herein are configured to perform congestion-based routing of SS7 signaling messages in response to congestion on a primary route. The methods, systems, and computer program products described herein operate independently of whether the primary signaling route is in a failed state. As a result, unlike conventional routing in SS7 networks, rather than discarding messages of lower priority than the current congestion level, the messages can be rerouted and the efficiency of the signaling network can be increased.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for congestion-based routing of telecommunications signaling messages, the method comprising: at a first Signaling System 7 (SS7) network routing node:
    determining whether congestion exists on a primary SS7 signaling route to a destination SS7 network node;
    receiving SS7 telecommunications signaling messages directed towards the destination SS7 network node to be sent over the primary SS7 signaling route; and
    in response to determining that congestion exists on the primary SS7 signaling route, redirecting, from within the first SS7 network routing node, at least one of the SS7 telecommunications signaling messages to be sent over the primary SS7 signaling route to instead be sent to the destination SS7 network node via an alternate SS7 signaling route, wherein redirecting the at least one SS7 telecommunications signaling message includes providing congestion based routing data within the first SS7 network routing node for a congested linkset configured as the primary SS7 route, comparing a message priority level contained in each of the received SS7 telecommunications signaling messages to a congestion level indicated by the congestion based routing data, and redirecting each of the received SS7 telecommunications signaling messages with the message priority level that is lower than the congestion level to the destination SS7 network node over the alternate SS7 signaling route, wherein the congestion based routing data is configured to redirect a portion of the traffic received for the primary route over a linkset corresponding to an alternate route while the primary route is operational.

2. The method of claim 1 wherein the first SS7 network routing node includes a signaling transfer point (STP).

3. The method of claim 1 wherein determining whether congestion exists on the primary SS7 signaling route comprises determining a number of messages waiting to be transmitted over a link associated with the primary SS7 signaling route.

4. The method of claim 1 wherein determining whether congestion exists on the primary SS7 signaling route comprises determining a number of messages transmitted over a link associated with the primary SS7 signaling route that are waiting to be acknowledged by a remote endpoint.

5. The method of claim 1 wherein determining whether congestion exists on the primary SS7 signaling route to a destination SS7 network node comprises determining whether congestion on the primary SS7 signaling route has reached a first congestion level.

6. The method of claim 5 wherein redirecting at least one of the SS7 telecommunications signaling messages to be sent over the primary SS7 signaling route to an alternate SS7 signaling route to the destination SS7 network node comprises:
    determining a priority level of each of the SS7 telecommunications signaling messages; and
    redirecting messages of at least one predetermined priority level over the alternate SS7 signaling route in response to congestion reaching the first congestion level.

7. The method of claim 6 wherein redirecting messages of the at least one predetermined priority level over the alternate SS7 signaling route comprises redirecting a percentage of the messages of the at least one predetermined priority level to the alternate SS7 signaling route.

8. The method of claim 5 wherein redirecting at least one of the SS7 telecommunications signaling messages to be sent over the primary SS7 signaling route to the alternate SS7 signaling route to the destination comprises:
    (a) determining whether the primary SS7 signaling route is at the first congestion level for a first time duration; and
    (b) in response to determining that the primary SS7 signaling route is at the first congestion level for the first time duration, redirecting messages to be sent over the primary SS7 signaling route to the alternate SS7 signaling route to the destination SS7 network node.

9. The method of claim 8, comprising:
    (a) in response to determining that the primary SS7 signaling route is at the first congestion level for the first time duration, determining whether the primary SS7 signaling route is at a second congestion level for a second time duration, the second congestion level being lower than the first congestion level; and
    (b) in response to determining that the primary SS7 signaling route is at the second congestion level for the second time duration, redirecting messages to be sent over the alternate SS7 signaling route to the primary SS7 signaling route.

10. The method of claim 1 wherein at least one of the primary and alternate SS7 signaling routes corresponds to a TDM-based SS7 signaling linkset.

11. The method of claim 1 wherein at least one of the primary and alternate SS7 signaling routes corresponds to an IP-based SS7 signaling linkset.

12. A system for congestion-based routing, the system comprising:
    a first Signaling System 7 (SS7) network routing node comprising:
        an interface module for sending and receiving SS7 telecommunications signaling messages over a primary SS7 signaling route to a destination SS7 network node; and
        a routing function for monitoring congestion on the primary SS7 signaling route and, in response to detecting congestion on the primary SS7 signaling route, for switching at least some of the SS7 telecommunications signaling messages to be sent to the destination SS7 network node over an alternate SS7 signaling route, wherein switching at least some of the SS7 telecommunications signaling message includes providing congestion based routing data within the first SS7 network routing node for a congested linkset configured as the primary SS7 route, for comparing a message priority level contained in each of the received SS7 telecommunications signaling messages to a congestion level indicated by the congestion based routing data, and for redirecting each of the received SS7 telecommunications signaling messages with the message priority level that is lower than the congestion level to the destination SS7 network node over the alternate SS7 signaling route, wherein the congestion based routing data configured to redirect a portion of the traffic received for the primary route over a linkset corresponding to an alternate route while the primary route is operational.

13. The system of claim 12 wherein the interface module and the routing function comprise components of a signal transfer point (STP).

14. The system of claim 12 wherein the interface module comprises a TDM-based interface module for sending and receiving SS7 telecommunications signaling messages over at least one TDM-based SS7 signaling link.

15. The system of claim 12 wherein the interface module comprises an IP-based interface module for sending and receiving SS7 telecommunications signaling messages over at least one IP-based SS7 signaling link.

16. The system of claim 12 wherein, in determining whether congestion exists on the primary SS7 signaling route, the routing function is adapted to determine a number of messages waiting to be transmitted over a link associated with the primary SS7 signaling route.

17. The system of claim 12 wherein, in determining whether congestion exists on the primary SS7 signaling route, the routing function is adapted to determine a number of messages transmitted over a link associated with the primary SS7 signaling route that are waiting to be acknowledged by a remote endpoint.

18. The system of claim 12 wherein, in determining whether congestion exists on the primary SS7 signaling route to a destination, the routing function is adapted to determine whether congestion on the primary SS7 signaling route has reached a first congestion level.

19. The system of claim 18 wherein, in redirecting at least some of the SS7 telecommunications signaling messages over an alternate route, the routing function is adapted to:
  determine a priority level of each of the messages; and
  redirect messages of at least one predetermined priority level over the alternate SS7 signaling route in response to congestion reaching the first congestion level.

20. The system of claim 19 wherein, in redirecting the messages of the at least one predetermined priority level over the alternate SS7 signaling route, the routing function is adapted to redirect a percentage of messages of the at least one priority level to the alternate SS7 signaling route.

21. The system of claim 18 wherein, in redirecting at least some of the plurality of signaling messages to the alternate route, the routing function is adapted to:
  (a) determine whether the primary SS7 signaling route is at the first congestion level for a first time duration; and
  (b) responsive to determining that the primary SS7 signaling route is at the first congestion level for the first time duration, redirect messages to be sent over the primary SS7 signaling route to the alternate SS7 signaling route to the destination SS7 network node.

22. The system of claim 21 wherein, in redirecting at least some of the SS7 telecommunications signaling messages over the alternate route, the routing function is adapted to:
  (a) in response to determining that the primary SS7 signaling route is at the first congestion level for the first time duration, determine whether the primary SS7 signaling route is at a second congestion level for a second time duration, the second congestion level being lower than the first congestion level; and
  (b) in response to determining that the primary SS7 signaling route is at the second congestion level for the second time duration, redirect messages to be sent over the alternate SS7 signaling route to the primary SS7 signaling route.

23. A non-transitory computer readable medium having stored thereon computer executable instructions that when executed by a processor of a computer control the computer to perform:
  at a first Signaling System 7 (SS7) network routing node:
    determining whether congestion exists on a primary SS7 signaling route to a destination SS7 network node;
    receiving SS7 telecommunications signaling messages directed towards the destination SS7 network node to be sent over the primary SS7 signaling route; and
    in response to determining that congestion exists on the primary SS7 signaling route, redirecting, from within the first SS7 network routing node, at least one of the SS7 telecommunications signaling messages to be sent over the primary SS7 signaling route to instead be sent to the destination SS7 network node via an alternate SS7 signaling route, wherein redirecting the at least one SS7 telecommunications signaling message includes providing congestion based routing data within the first SS7 network routing node for a congested linkset configured as the primary SS7 route, comparing a message priority level contained in each of the received SS7 telecommunications signaling messages to a congestion level indicated by the congestion based routing data, and redirecting each of the received SS7 telecommunications signaling messages with the message priority level that is lower than the congestion level to the destination SS7 network node over the alternate SS7 signaling route, wherein the congestion based routing data is configured to redirect a portion of the traffic received for the primary route over a linkset corresponding to an alternate route while the primary route is operational.

24. The non-transitory computer readable medium of claim 23 wherein redirecting at least one of the SS7 telecommunications signaling messages to be sent over the primary SS7 signaling route to an alternate route comprises:
  (a) determining whether congestion on the primary SS7 signaling route has reached a predetermined congestion level;
  (b) determining a priority level of each of the messages; and
  (c) redirecting messages of at least one predetermined priority level over the alternate SS7 signaling route in response to congestion reaching the predetermined congestion level.

* * * * *